United States Patent [19]

Williams

[11] Patent Number: 4,679,330

[45] Date of Patent: Jul. 14, 1987

[54] CONCENTRICITY GAUGE

[76] Inventor: Kenneth L. Williams, 3060 Country Club Dr., Costa Mesa, Calif. 92626

[21] Appl. No.: 808,037

[22] Filed: Dec. 12, 1985

[51] Int. Cl.⁴ ............................................. G01B 5/20
[52] U.S. Cl. .................................... 33/550; 33/147 E
[58] Field of Search .................... 33/550, 543, 172 R, 33/172 D, 147 E, 147 M, 199 B

[56] References Cited

U.S. PATENT DOCUMENTS

| | | | |
|---|---|---|---|
| 2,770,050 | 11/1956 | Johnson | 33/550 |
| 2,820,300 | 1/1958 | Gadomski | 33/147 E |
| 3,091,867 | 6/1963 | Ryan, Jr. | 33/199 R |
| 3,316,648 | 5/1967 | Klaassen | 33/172 R |
| 3,564,721 | 2/1971 | Wilson | 33/550 |
| 3,791,039 | 2/1974 | Allix | 33/147 E |
| 3,826,011 | 7/1974 | D'Aniello | 33/147 E |
| 3,913,234 | 10/1975 | Windle | 33/147 E |

Primary Examiner—Willis Little
Attorney, Agent, or Firm—Leonard Tachner

[57] ABSTRACT

A portable, self-contained precision concentricity gauge having a workpiece support portion and gauge support portion mounted on a unitary base plate. The workpiece support portion uses a pair of driven rollers and a moveable idler roller to rotationally support a workpiece. The gauge support portion comprises a gauge carrier which rides on a carrier shaft cantilevered out from the workpiece support portion and adapted for three directions of motion relative to the workpiece. A guide shaft, parallel to the carrier shaft, cooperates with a magnet on the gauge carrier for permitting rotation of the gauge carrier and probe for replacing the workpiece without disturbing the position adjustment of the probe.

7 Claims, 6 Drawing Figures

CONCENTRICITY GAUGE

BACKGROUND OF THE INVENTION

1. Field of the Invention

The present invention relates generally to concentricity gauges and more particularly, to an improved precision concentricity gauge which is entirely self-contained and portable and which provides a convenient means for measuring the deviation from concentricity of a bore, recess or periphery of a round part wherein deviation from concentricity can be easily read from the graduated dial of a dial indicator.

2. Prior Art

The general concept of providing a gauge-like device for measuring the concentricity of a workpiece is old in the art. However, prior art devices which are capable of providing a precise indication of eccentricity of a part or workpiece suffer the disadvantage of being relatively complex in structure and therefore, costly to manufacture and expensive to the purchaser. Furthermore, such costly devices are typically required in the quality control and inspection departments of manufacturing companies. However, because of the high cost, the manufacturer is discouraged from purchasing a sufficient quantity of such gauges. The inadequate number of such expensive gauges in a typical inspection or quality control department creates a bottleneck in the production line thereby indirectly further increasing the costs of products that gauges of that type are used to inspect. Furthermore, irrespective of the costs of such prior art devices, the complexity of their use also adds to the delay incurred in inspection departments and quality control departments for assessing the concentricity of such parts. Consequently, there has been a long-felt need for a concentricity gauge which is simple in structure, inexpensive to produce and simple and expedient to utilize by permitting rapid placement of the workpiece in the gauge for measurement.

Typical prior art concentricity gauges include those disclosed in the following U.S. Pat. Nos.: 2,831,258 (Eisele); 4,222,173 (Hall; 4,414,748 (Gauler et al).

Other less relevant prior art consists of the following U.S. Pat. Nos.: 2,806,294 (Cargill); 3,125,811 (Pierce et al); 3,564,721 (Wilson); 3,826,011 (D'Aniello); 4,080,741 (Siddal et al); 4,517,744 (Consales et al); 4,531,294 (Lenz).

U.S. Pat. No. 2,831,258 to Eisele is directed to what is termed a precision eccentricity gauge which provides for a gauge member mounted to a gauge holder which is movable in an axial direction. This prior art system includes a probe which is insertable into the bore of a workpiece. However, this reference typifies the complexity and expense of prior art gauges of the type herein disclosed. By way of further example, U.S. Pat. No. 4,414,748 to Gauler et al is directed to a ball mounting fixture for a roundness gauge. A stylus is offset radially from the axis of a spindle approximately the distance of the radius of the ball. The stylus travels in a substantially horizontal orbit around the ball as opposed to linear displacement. A vertical chuck assembly supports the ball in a stationary position when the measurements are taken and rotates the ball about a vertical axis, U.S. Pat. No. 4,222,173 to Hall is directed to a shaft and bore misalignment measuring tool showing a dial member coupled to a probe member for measuring the concentricity of a bore of a workpiece. Unfortunately, none of the aforementioned prior art patents nor any other prior art known to the applicant, satisfies the aforementioned long-felt need for a simple, portable, self-contained, low cost concentricity gauge which is reliable and precise and which permits convenient placement and replacement of the parts to be measured.

SUMMARY OF THE INVENTION

The present invention comprises a novel and highly advantageous concentricity gauge which is portable, completely self-contained and of simple and low cost construction despite its high precision concentricity measuring capability. The gauge comprises a workpiece support portion and a gauge support portion, the latter being positioned relative to the former on a carrier shaft which permits variation in the relative spacing between the workpiece support portion and the gauge support portion whereby to control the position of a probe connected to the gauge.

The workpiece support portion comprises a pair of driven rollers symmetrically spaced relative to an idler roller, the latter being selectively retractable from the driven rollers whereby to permit easy placement of a workpiece between the three rollers whereby to measure the concentricity of the workpiece. The workpiece support portion and gauge support portion are contained above a commmon base plate thereby rendering the gauge both portable and self-contained with all portions of the gauge interconnected relative to the base whereby movement of the base provides all elements of the gauge necessary to carry out a concentricity measurement.

In one embodiment of the invention illustrated herein, the driven rollers are connected by shafts to a pair of drive bushings which are in turn connected to a manually rotatable dial by an O-ring. After the workpiece is placed between the three rollers and the probe is positioned relative to the circular surface the concentricity of which is to be measured, the manual dial may be rotated and the gauge connected to the probe observed to determine the degree to which the workpiece surface varies from perfect concentricity. One of the particularly novel aspects of the present invention resides in the unique design of the gauge support portion which permits rapid repositioning of the gauge and probe for removing one workpiece and placing another workpiece between the rollers. This may be accomplished while permitting precise repositioning of the probe and gauge in the same position relative to the previous workpiece thereby minimizing the time required to measure a plurality of identical workpieces. This capability is made possible by a guide shaft which is positioned parallel to the carrier shaft upon which the gauge support portion may be positioned axially with respect to the workpiece.

The gauge support portion utilizes a carrier which employs a magnet that comes in contact with the guide shaft when the gauge support portion is positioned properly for measuring the concentricity of the workpiece. However, when it is desired to replace the workpiece, the carrier may be rotated by applying rotational force to the carrier whereby to remove the aforementioned magnet from the guide shaft. This allows the carrier to be temporarily rotated out of the axial position adjacent the workpiece as will be hereinafter more fully explained.

OBJECTS OF THE INVENTION

It is therefore a principal object of the present invention to provide a novel, improved concentricity gauge which entirely overcomes or substantially reduces the disadvantages of the prior art.

It is an additional object of the present invention to provide a novel concentricity gauge for measuring the relative concentricity of workpieces having circular surfaces while providing a gauge which is portable, of unitary structure of low manufacturing cost and therefore less expensive to the purchaser.

It is still an additional object of the present invention to provide a unique concentricity gauge comprising a workpiece support portion and a gauge support portion, both supported relative to a unitary base whereby the gauge support portion is adapted to permit rotation of the gauge and attached measuring probe relative to the workpiece for quick and simple replacement of the workpiece to speed up the measurement process.

It is still an additional object of the present invention to provide a concentricity gauge utilizing a novel combination of rollers for holding the workpiece in the proper position for concentricity measurement by a probe and gauge combination whereby the rollers may be repositioned relative to one another in a simple and expedient manner to permit expedient replacement of the workpiece by a new workpiece.

BRIEF DESCRIPTION OF THE DRAWINGS

The aforementioned objects and advantages of the present invention as well as additional objects and advantages thereof will be more fully understood hereinafter as a result of a detailed description when taken in conjunction with the drawings in which.

DETAILED DESCRIPTION OF A PREFERRED EMBODIMENT

Figure 1:
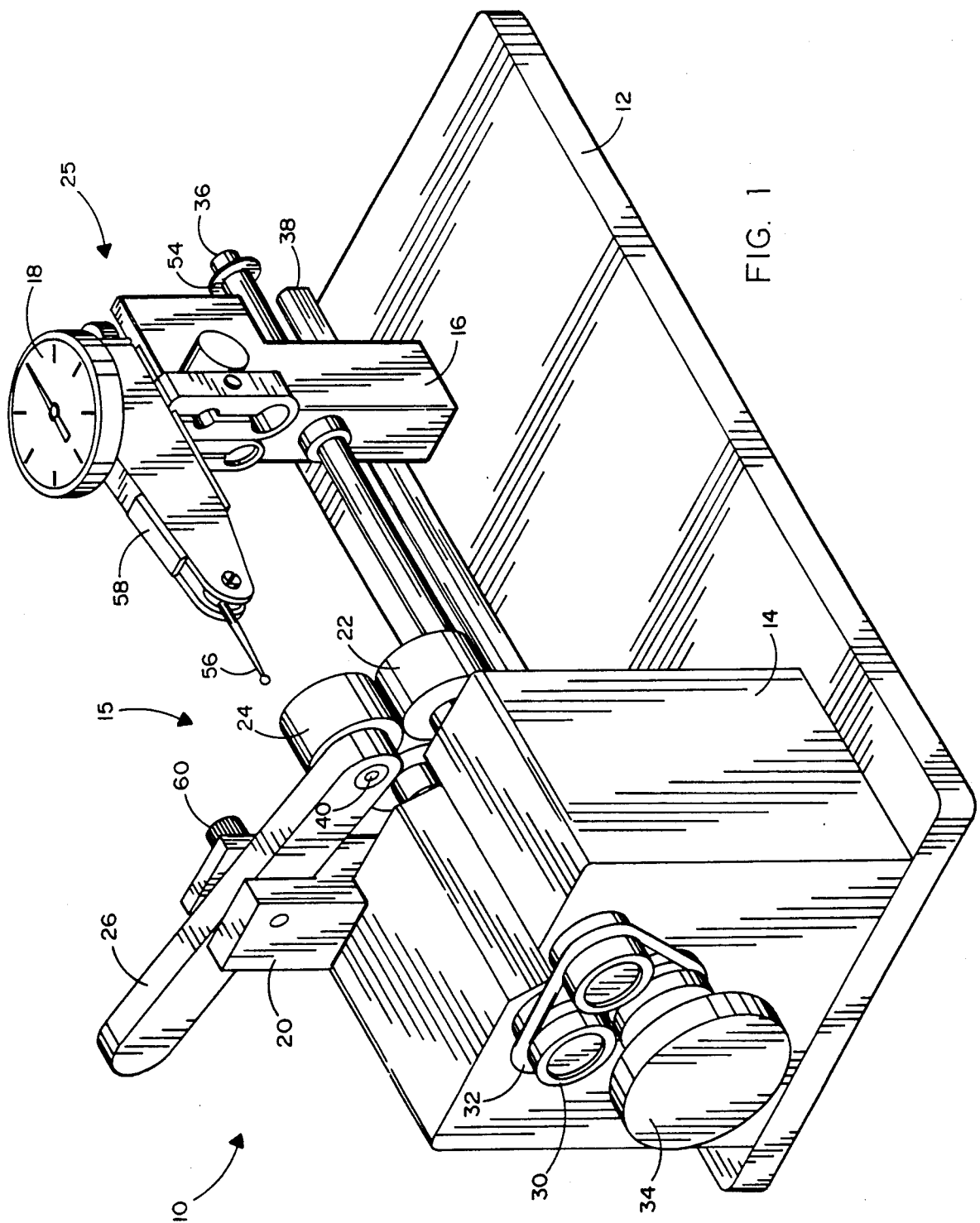
FIG. 1 is a three dimensional view of the concentricity gauge of the present invention.

Referring to the figures it will be seen that the concentricity gauge 10 of the present invention comprises a base 12, a block 14 and a gauge carrier 16 on which is mounted a gauge 18. The block 14 is the principal component of a workpiece support portion 15 and the gauge carrier 16 is the principal element of a gauge support portion 25. The workpiece support portion 15 and gauge portion 25 of the concentricity gauge 10 of the present invention are in effect, interconnected by a pair of shafts including a carrier shaft 36 and a guide shaft 38, both of which are cantilevered in parallel relation from the block 14 as will be hereinafter more fully described.

Other elements of the workpiece support portion 15 of the invention include a yoke 20 on which is mounted a clamp bar 26 connected at a clamp fulcrum 60 and supporting an idler roller at one end which can be raised or lowered by applying vertical force to the opposite end of the clamp bar. The idler roller 24 is positioned symmetrically with respect to a second and third roller, namely, driven rollers 22. The driven rollers 22 are in turn connected to a pair of drive bushings 30 by means of parallel shafts 40 that extend through the length of the block 14. The drive bushings are connected to a dial 34 by means of an O-ring 32 whereby rotation of the dial 34 causes the two drive bushings to rotate in a common direction.

Figure 5:
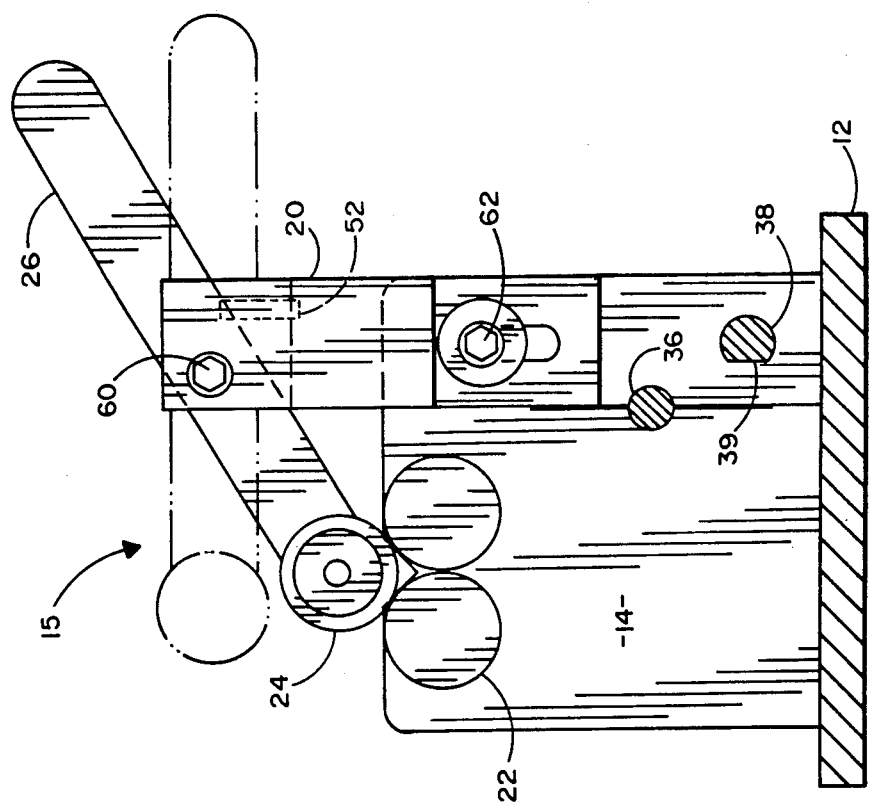
FIG. 5 is an end view of the workpiece support portion of the invention.

As seen best in FIG. 5, the clamp bar 26 is positioned relative to the yoke 20 whereby to engage a spring 52 whenever a downwardly directed vertical force is applied to one end of the clamp bar whereby to rotate the clamp bar clockwise as seen in FIG. 5 thereby raising the idler roller 24 relative to the driven rollers 22 whereby to enable one to place a workpiece such as workpiece 35 seen in FIG. 3, between the three rollers 22 and 24 for the measurement process hereinafter described.

Figure 2:
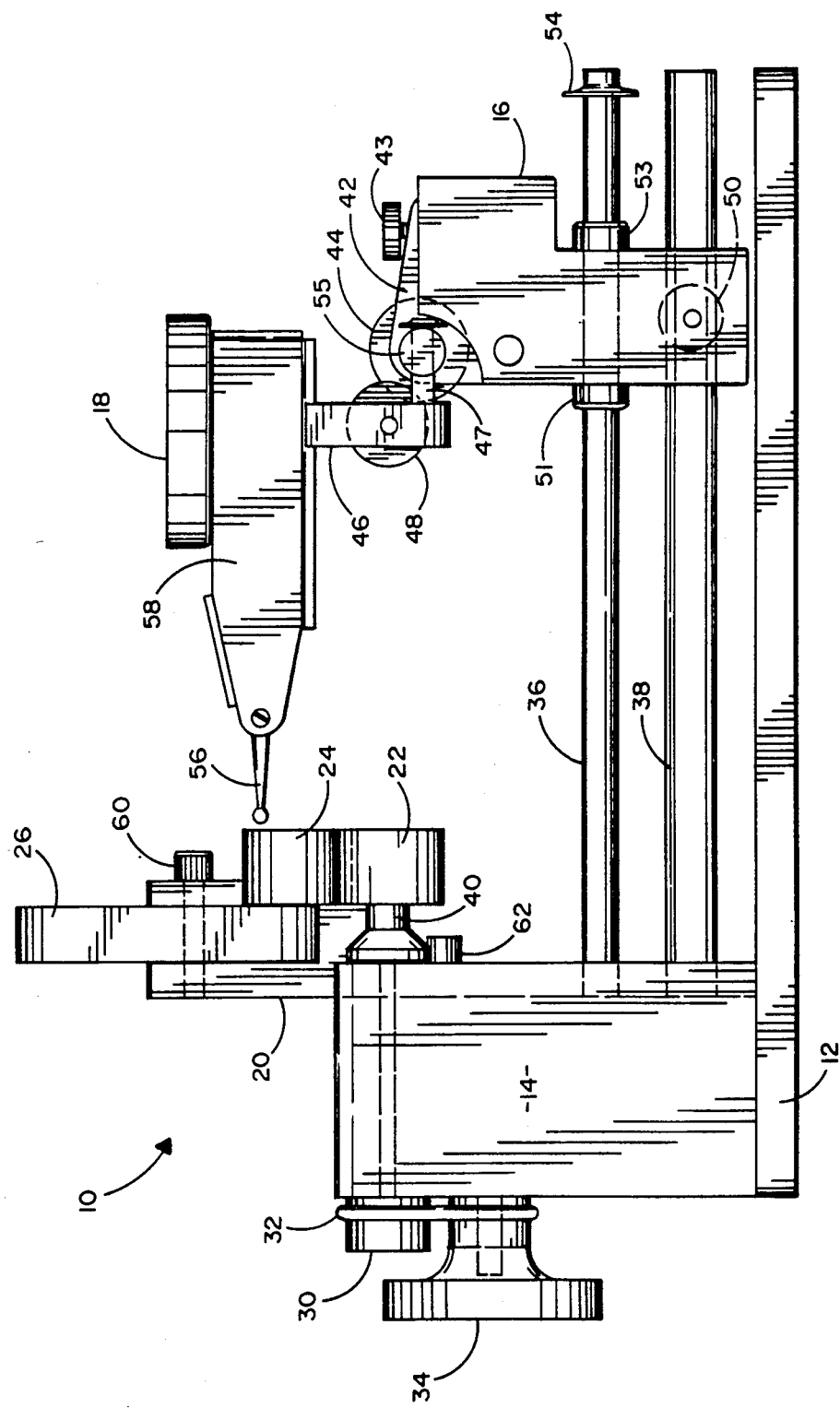
FIG. 2 is a front view of the invention.

The gauge of support portion 25 of the present invention comprises principally the gauge carrier 16 which is mounted on the carrier shaft 36 for linear motion along the axis of shaft 36. This motion enables the operator of the present invention to control the position of a probe 56 extending from a probe support assembly 58 relative to the workpiece which is held in place between the idler roller 24 and the two driven rollers 22. The linear motion along the shaft 36 by the gauge carrier 16 is facilitated by a pair of bearings 51 and 53 as shown in FIGS. 2 and 3 for example. Bearings 51 and 53 may for example be provided with respective ball bearings races which facilitate easy and expedient axial motion of the gauge carrier 16 along the shaft 36.

Figure 3:
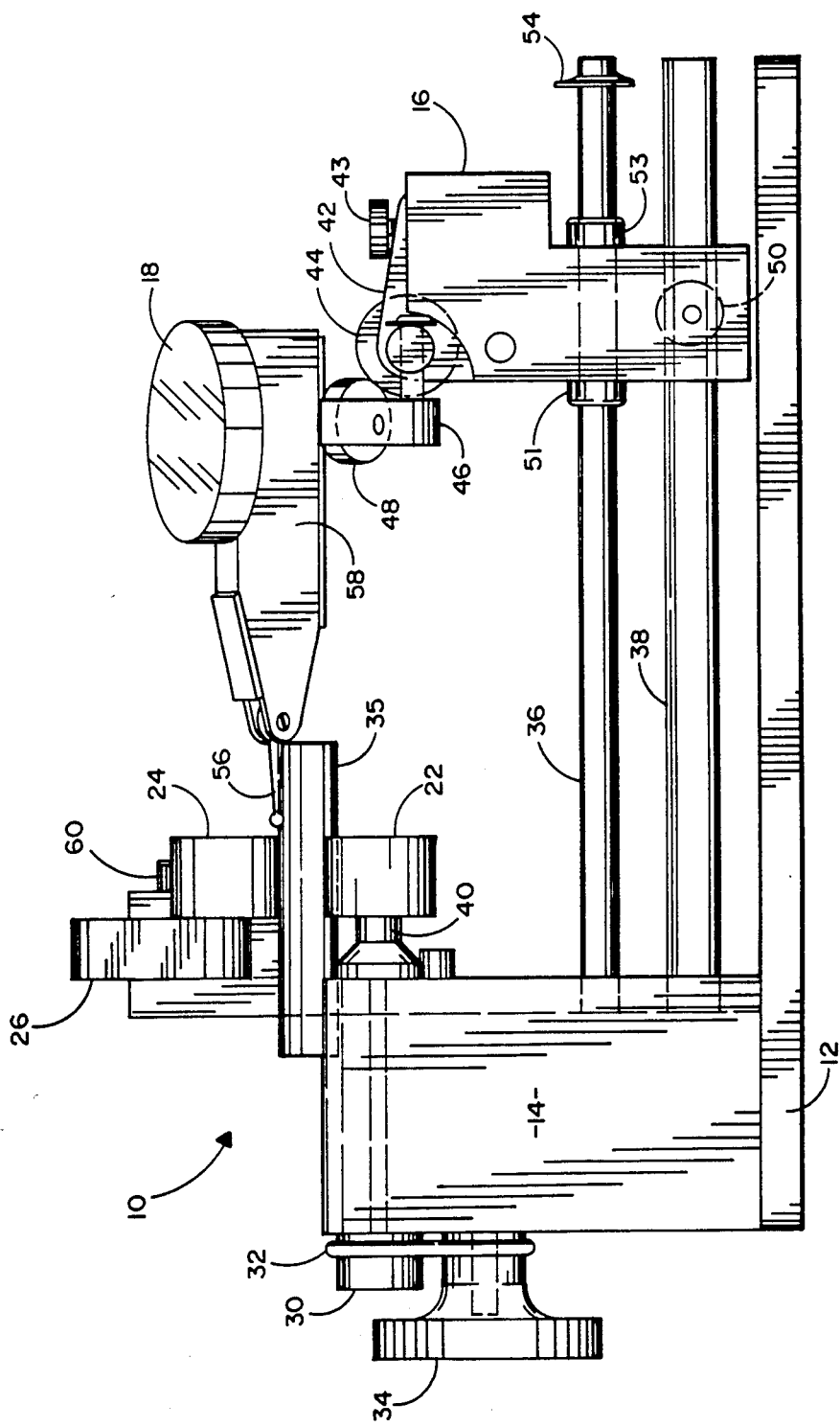
FIG. 3 is a front view of the invention similar to that of FIG. 2 but illustrating the invention with a workpiece in place and the probe adjusted to take the measurement of concentricity.
Figure 6:
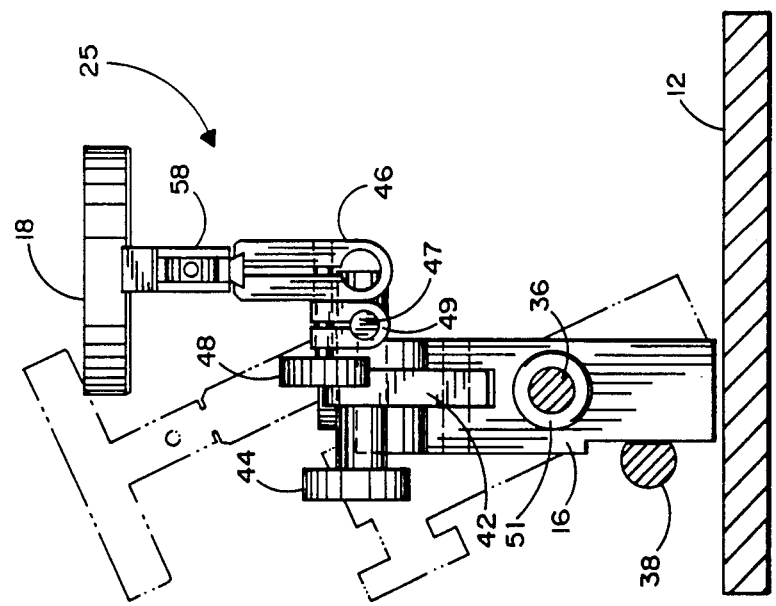
FIG. 6 is an end view of the gauge support portion of the present invention.

The carrier 16 is provided with a magnet 50 and guide shaft 38 is provided with a flat portion 39 along the entire length thereof which is adapted to engage the surface of the magnet 50 when the gauge carrier 16 is precisely vertical as shown for example in FIGS. 1, 2 and 3. However, as seen best in FIG. 6, the magnet 50 is readily disengaged from the flat portion 39 of guide shaft 38 whereby to permit rotation of the gauge carrier 16 about the carrier shaft 36 whereby to rotate the gauge 18 as well as the probe 56 and probe support assembly 58 away from the workpiece 35 whereby to permit removal of the workpiece and placement of a new workpiece between the idler roller 24 and driven rollers 22. Carrier shaft 36 is preferably provided with a cap 54 which is designed to prevent inadvertent removal of the gauge carrier from the carrier shaft in the event that the gauge carrier is moved from the workpiece along the carrier shaft too great a distance.

In addition to the linear motion readily imparted to the probe 56 and probe support assembly 58 by means of positioning the gauge carrier 16 along the carrier shaft 36, the gauge support portion 25 of the present invention also provides two additional degrees of motion to enable easy positioning of the probe 56 relative to virtually any shape and size workpiece. Thus, for example as seen in FIG. 3 the gauge probe and probe assembly may be rotated about an axis that is parallel to the carrier shaft 36. This repositioning capability of the gauge 18 is provided by the components seen best in FIG. 6 wherein it is shown that the probe support assembly 58 is attached to a gauge clamp 46 which is secured by an adjustment screw 48. These elements are supported on a shaft 47 relative to the remaining components of the gauge carrier 16. Shaft 47 extends through a adjustment clamp 49 which sits between the gauge clamp 46 and the adjustment screw 48. When it is desired to adjust the probe in the direction illustrated in FIG. 3 which may for example be called the yaw adjustment, adjustment screw 48 may be loosened thereby releasing the grasp of the adjustment clamp 49 on the shaft 47 permitting the combination of clamp 49 as well as the adjustment screw 48, the gauge clamp 46 and the probe support assembly with attendant probe, to be rotated about shaft 47 to achieve the probe adjustment illustrated in FIG. 3.

Figure 4:
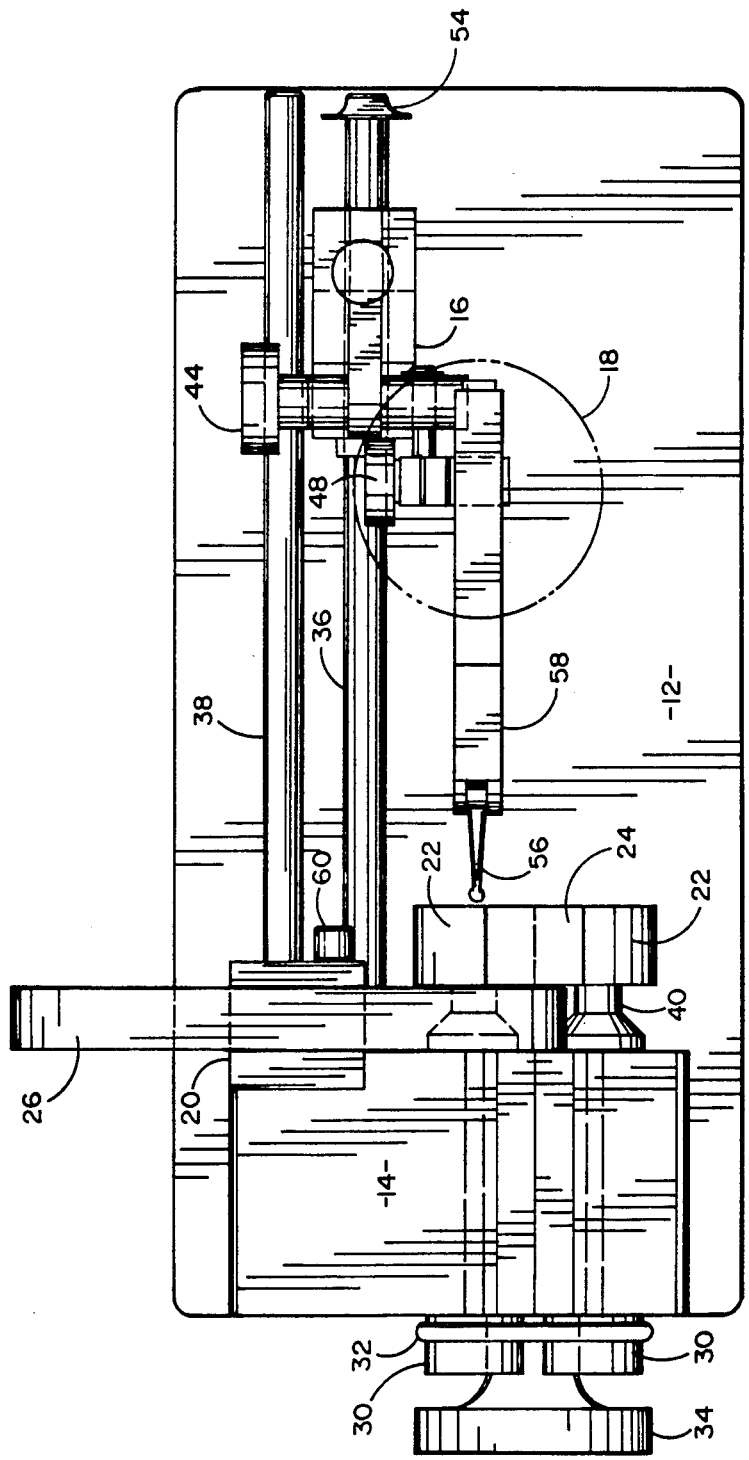
FIG. 4 is a top view of the invention.

Probe 56 may also be adjusted in elevation, that is, about a second axis that is pependicular to both the carrier shaft 36 and the guide shaft 38 and in the plane of FIG. 4. More specifically, the present invention is provided with a clamp nut 44 which is connected to an elevation adjustment shaft 55 shown in FIG. 2 for example which extends through a clamp plate 42. The clamp plate is fastened to the gauge carrier 16 by means of the plate fastener 43. When it is desired to adjust the elevational position of the probe 56, clamp nut 44 may be loosened to permit angular adjustment of the shaft 55 whereby to elevationally adjust probe 56, probe support assembly 58, gauge 18 along with the attendant components for the yaw adjustment including the clamps 46 and 49.

Those having skill in the art to which the present invention will, as a result of the above description of the various components of the gauge 10, now realize that one of the principal advantages of the gauge is expedient placement of the workpiece and expedient adjustment of the probe relative to the workpiece. More specifically, it will be understood that the workpiece is readily placed between the idler roller 24 and driven roller 22 by control of the clamp bar 26 about the clamp fulcrum 60 whereby to temporarily raise idler roller 24 relative to the driven rollers in order to place the workpiece 35 symmetrically between the three rollers. This placement permits rotation of the workpiece by means of manual rotation of dial 34. Of course it will be understood that although the present invention has been found to be particularly advantageous from a cost and convenience point of view by providing a manual dial 34, the present invention is also readily provided in a configuration which replaces the manual dial 34 with a suitable motorized shaft if that is desired. In any case, the workpiece support portion 15 of the present invention provides a convenient means for positioning and rotating the workpiece for concentricity measurements.

The measurement operation is carried out by the gauge 18 to which the probe 56 and assembly 58 are attached. A key advantage of the gauge support portion of the present invention is the relative ease with which the probe 56 can be adjusted relative to the workpiece to accomodate virtually any size workpiece whereby to provide a precise indication of the concentricity of any circular surface thereof. Capability for adjustment in three perpendicular directions is provided in the form of linear motion of the gauge carrier along a carrier shaft as well as elevational and yaw adustment capabilities of the probe whereby to place the probe tip along a surface of the workpiece to be measured upon rotation of the workpiece. However, a particularly novel and advantageous portion of the invention resides in the easy manner in which the workpiece support portion can accomodate repeated measurements of similar workpieces or identical workpieces by simply rotating the gauge carrier 16 about the carrier shaft 36 by disengaging the magnet 50 from the flattened portion 39 of the guide shaft 38 whereby to move the gauge, probe and probe assembly out of the path of the workpiece to enable one to readily remove the workpiece and replace it with another workpiece. The particular advantage derived in this capability in the present invention is especially noteworthy when it is necessary to adjust the workpiece probe 56 to accomodate a particular shaped workpiece and it is desired to measure a plurality of identical shaped workpieces in a short period of time by providing the capability to rotate the gauge carrier in its entirety with the probe adjustment in elevation and yaw and linear positioning maintained. One can then replace the workpiece and reposition the gauge carrier in an identical location relative to the workpiece without incurring any additional delay for readjusting the probe.

Thus it will be seen that the simplicity of the present invention not only saves money in the initial purchase because the gauge is manufactured at lower cost relative to more complex prior art concentricity gauges, but in addition, the relative ease and simplicity of its operation allows the user to expedite measurement of workpiece concentricity particularly when the measurement is of a plurality of identically shaped workpieces for which the probe position can be retained substantially constant during the entire measurement process.

It will now be understood that what has been disclosed herein is a portable, self-contained, highly advantageous improved concentricity gauge which comprises a workpiece support portion and a gauge support portion interconnected by a carrier shaft which is cantilevered from the work support portion and all of which reside over a common base plate thereby enabling convenient use and transport of the gauge. The principal advantages of the present invention reside in the simplicity of construction and in the elegance of measurement capability in the form of expedient means for placing the workpiece in a position relative to a probe for rotation and the placement of the probe relative to the workpiece to enable measurement of the workpiece concentricity along a selected circular surface by a gauge. A particularly advantageous feature resides in the ability to rotate the gauge carrier away from the workpiece without disturbing the ease of resetability of the workpiece and probe positions whereby to enable expeditious measurement of a plurality of identically shaped workpieces thereby reducing the cost of using the present invention.

As a result of the applicant's teaching herein, it will now be apparent to those having skill in the art to which the present invention pertains, that various additions and modifications may be made to the present invention. By way of example, there are numerous alternative ways in which the probe, probe assembly and gauge may be supported relative to the gauge carrier whereby to provide the capability for varying the position of the probe relative to the workpiece. Those specific means for providing the probe position adjustment capability of the present invention disclosed herein have been selected as an exemplary illustration only in a particular preferred embodiment of the invention. However, it will also be understood that all such modifications and additions are within the scope of the present invention which is to be limited only by the claims appended hereto.

I claim:

1. An apparatus for measuring the concentricity of a workpiece, the apparatus of the type having a workpiece support portion for rotationally supporting a workpiece and having a gauge support portion for positioning a probe and gauge relative to the workpiece, the apparatus comprising:

a workpiece support portion having at least one driven roller and at least one idler roller for retaining and rotating said workpiece;

a gauge support portion having means for adjustment of said probe in at least two directions relative to said workpiece for contacting said probe to said workpiece, and having means for positioning said probe away from said workpiece for gaining access to said workpiece without disturbing said adjustment of said probe for the next workpiece, and a pair of parallel shafts extending from said workpiece support portion, one of said shafts extending into said gauge support portion for controlling the path of travel between said probe and said workpiece, the other of said shafts being adapted for selective engagement with said gauge supporting portion for holding said probe at a selected position relative to said workpiece, said gauge support portion being rotatable about the axis of said one of said shafts.

2. The apparatus recited in claim 1 wherein said workpiece support portion comprises two driven rollers and one idler roller, said driven rollers driven by a manual dial for rotating said workpiece.

3. The apparatus recited in claim 1 further comprising a carrier shaft extending from said workpiece support portion and into said gauge support portion for controlling the path of travel between said probe and said workpiece.

4. The apparatus recited in claim 1 further comprising a unitary base for receiving said support portions whereby said apparatus is portable.

5. The apparatus recited in claim 2 further comprising means for controlling the position of said idler roller relative to said driven rollers whereby a workpiece may be installed and removed by temporarily positioning said idler roller at a selected distance from said driven rollers.

6. The apparatus recited in claim 5 wherein said controlling means is spring loaded to cause said idler roller to forcefully engage said driven rollers for holding said workpiece.

7. An apparatus for measuring the concentricity of a workpiece, the apparatus of the type having a workpiece support portion for rotationally supporting a workpiece and having a gauge support portion for positioning a probe and gauge relative to the workpiece, the apparatus comprising:

a workpiece supporting portion having at least one driven roller and at least one idler roller for retaining and rotating said workpiece; and a gauge support portion having means for adjustment of said probe in at least two directions relative to said workpiece for contacting said probe to said workpiece, and having means for positioning said probe away from said workpiece for gaining access to said workpiece without disturbing said adjustment of said probe for the next workpiece, a pair of parallel shafts extending from said workpiece support portion, one of said shafts extending into said gauge support portion for controlling the path of travel between said probe and said workpiece, the other of said shafts being adapted for selective engagement with said gauge supporting portion for holding said probe at a selected position relative to said workpiece, and wherein said gauge support portion comprises magnetic means for said selective engagement with said other of said shafts and wherein said gauge support portion is rotated about said one of said shafts whenever said magnetic means is disengaged from said other of said shafts.

* * * * *